Patented July 13, 1926.

1,592,062

UNITED STATES PATENT OFFICE.

WEBSTER E. BYRON BAKER, OF YORK HAVEN, PENNSYLVANIA.

PROCESS FOR THE CONVERSION OF SULPHITE WASTE LIQUORS INTO TANNING EXTRACTS.

No Drawing.   Application filed February 25, 1922.   Serial No. 539,284.

The present invention consists of a new process for the utilization of waste liquors from the manufacture of sulphite wood pulp. The process has for its purpose the preparation of an improved extract suitable for tanning leather from said liquors.

Sulphite waste liquors, as they are commonly called, consist of a mixture of organic compounds derived from the portions of the wood which are rendered soluble during the process of cooking the chips under pressure in the digester by the sulphite process, thereby converting them into pulp to be used for making paper. The cooking liquor, or "cooking acid" as it is called, contains at the start of the process calcium bisulphite, with an excess of sulphurous acid, in solution in such a manner that the total sulphurous acid present is equal to about five per cent, while that combined with the lime or calcium as monosulphite is about one per cent, or expressed as bisulphite, about two per cent. The wood contains principally cellulose, lignin, carbohydrates, and other organic matter in small quantities, and small amounts of inorganic or mineral matter. During the cooking process the lignin, carbohydrates and organic matter are to a very large extent dissolved, while the cellulose is left as pulp, these changes being effected by the cooking acid, and proper steaming and gas relieving conditions.

The liquors coming from the digester with the finished pulp when it is discharged into the blow pit, containing newly formed compounds known as lignosulphonic acids, and the lime salts of these acids, together with carbohydrates, sugars and an excess of free sulphurous acid, and some compounds containing very loosely combined sulphurous acid, are generally wasted. These liquors, the solid content of which represents about 50% of the weight of the wood, form the principal starting material for the process about to be described. The total solids concentration of these liquors is usually from five to eight per cent.

The first step in the new process consists in collecting these liquors while still nearly boiling hot, filtering out any and all fibers and solid materials in suspension, and pumping while still very hot, through a very fine spray nozzle or nozzles into air under sufficient pressure to produce a mist. The principal object of this step is the volitization of some of the undesirable or injurious gaseous impurities or components, which act at least in part as acids, and which, if not removed, would make a greater addition of the reagents in the following step necessary. A further object is the oxidation of some very complex organic compounds present. As an inevitable consequence of the spray action there is some evaporation and consequent cooling of the liquor.

The second step in the process consists in the collection of these sprayed liquors, and subsequent treatment at a temperature of substantially not less than 80 to 85° centigrade with the oxide or hydroxide of an alkaline earth metal in a tank provided with an efficient agitator, until the loosely combined sulphur dioxide contained in the liquor is changed to the sulphite of the alkaline earth metal, and until the hydrogen ion concentration of the liquor is substantially such as is designated by the symbol or expression $pH=9$. The first half or two thirds (not more) of the required treatment may be done in some respects advantageously with the equivalent amount of a carbonate of an alkaline earth metal, if this is desirable or cheaper, but the rate of reaction is affected unfavorably, carbonate of an alkaline earth metal being considered an equivalent and as such included in the claims. When using the oxide, it is always slaked, forming a hydroxide solution or suspension. The hydroxide is also always furnished in dissolved or suspended form.

The selection of the alkaline earth metal oxide, hydroxide, or carbonate is governed by cost to a large extent, but disregarding this factor the chemical consideration entering into the proposition are the solubilities of the various treating compounds, and the solubilities of the products resulting therefrom. In this process it is most favorable chemically to use the compounds of those alkaline earth metals which have the most soluble hydroxides, and which form the least soluble sulphites and sulphates. From these considerations it is apparent that in order of maximum to minimum desirability the alkaline earths should be arranged in the following order, viz, barium, strontium, calcium and magnesium. The comparatively low cost of lime, and the relative insolubility of its sulphate and sulphite make it quite satisfactory for the manufacture of a suitable commercial product at the present time. In step two one object is to accomplish principally three things, (1) the removal by conversion into insoluble form of some of the sulphur present, whether it be in the form of sulphates, sulphites, sulphurous acid gas, or loosely combined and reversible sulphurous acid, (2) the change of the reaction of the liquor from acidic to basic, (3) the conversion into insoluble form of any such compounds which would take place at much slower rate at lower temperatures. It may be noted that the reagent used should contain only minimum amounts of iron.

The third step in the process consists of filtering the insoluble matter produced in the second step from the resulting liquor. Complete separation is desirable, and the separated liquor should preferably be crystal clear. For this reason it is advisable to subject the liquor to sedimentation in any of the known sedimentation or thickening apparatus, or simply in a tank, for a sufficient time to settle the major portion of the larger particles. The supernatant liquor is drawn off and passed through a filter capable of holding the finest precipitates. While I do not limit this procedure to any particular form of filtration apparatus, it will be found preferable in most cases to use a high speed centrifugal of the unperforated basket or bowl type, which discharges the clear liquid from the basket or bowl without passing it through the cake, which is precipitated in a compact mass on the side of the bowl or basket, while the filtrate flows over the top of the basket or bowl, or out of the bottom. In step three the purpose is minimizing decompositon of the liquor in its subsequent treatment, and minimizing corrosion and the deposition of scale and incrustation in the apparatus. Furthermore, the resulting product is purer than it would be if filtration were not resorted to, and a valuable by-product consisting mostly of mono-sulphites is recovered.

The fourth step consists of the concentration of the resulting clear liquor to about 50% solids content, without decomposition. Decomposition is prevented by avoiding and minimizing the exposure of the liquid to high temperature, particularly as the concentration progresses. While any type of apparatus, or method of obtaining these conditions may be employed, it will be found most advantageous and most economical to do this in a multiple effect vacuum evaporator, and of these the rapid film type is most desirable. The evaporator may be constructed of cast iron, with narrow steel tubes. No appreciable increment in iron content will be experienced if the rapid film type is used. In step four, the object is principally conversion into commercial form, so that the shipment of the product in final form is economical.

The fifth step consists in the treatment of the above mentioned concentrated extract with sulphuric acid until the extract reacts just very faintly acid to the indicator Congo red, which is preferably applied in the form of Congo red test paper. The sulphuric acid used should be of such a strength as to possess a density between 32 and 35 degrees Baumé, at 15 degrees centigrade, and neither the concentrated extract nor the acid at the time of mixing should be at a temperature in excess of forty degrees centigrade nor should a temperature in excess of 40° C. be allowed to thereupon develop. The acid should be added very slowly, and the agitation of the mass of extract should be very efficient. Furthermore the entire treatment should be conducted in a vessel so arranged that iron will not come into contact with the mixture. A bronze or lead lined circular tank, equipped with bronze or lead covered agitator and heating coil will be very suitable. In this manner contamination of the extract with iron will be avoided. Furthermore, if the original extract prior to the addition of sulphuric acid, should contain sufficient iron to act detrimentally in the tanning of leather, the iron may be removed by any of the known methods. In step five one object is to convert the organic salts into the corresponding organic acids, which are really the tanning agents, and the simultaneous conversion of at least part of the basic constituents into insoluble form for subsequent removal.

The sixth step in the process consists of the filtration of the resulting extract, so as to completely remove all the solid matter in suspension. Precautions must also be taken to avoid contaminating the extract at this stage, in the same manner as stated above. This process may be carried out in various ways, by the application of several types of filtration apparatus, among which I may mention filter presses, pressure filters, gravity filters and vacuum filters of the usual types of construction, but it will be found most advantageous in a great number of cases to employ a centrifugal filter or clarifier, similar to such as is used in the clarification of varnish and heavy bodied oils. The filtration is conducted shortly after the acid treatment, at 35 to 40 degrees centigrade. The discharging extract will have a density of about 30 to 33 Baumé, and will contain not less than 50% solids in solution, at least half of which dissolved solids will be absorbable by a hide, or by powdered hide or hide powder which is sometimes used in the analysis of tanning fluids or materials. This product is now finished and ready for use in leather manufacture. In step six one object is purification of the final product, and the removal of some compounds which would injure leather and also cause the deterioration of the final extract. Furthermore, a by-product consisting principally of calcium sulphate is recovered.

As a modification of the above procedure the liquors, prior to the second step, may be subjected to partial fermentation into ethyl alcohol by any of the known processes. This utilizes the fermentable sugars, and reduces the percentage of inert organic substances dissolved in the resulting tanning extract.

The above process is an improvement inasmuch as the quality of the resulting product is improved, and the cost of manufacture is lowered. For example, the resulting product may be used alone in the tanning of leather, or in combination with certain other tanning agents. The leather produced has more desirable and more permanent qualities and characteristics than leather made from hides treated with extracts made from sulphite waste liquors in the past. Past extracts were applicable only in the "drumming in" process, and served more strictly as fillers than as tanning agents. Furthermore, the process represents improvement in the reduction of the amount of treating agent necessary, and in the fact that the filtration and type of evaporation reduces the rate of scale formation and corrosion in the apparatus.

It will be obvious to those skilled in the art that modifications may be made in details of procedure and that chemical equivalents may be substituted without departing from the spirit of the invention which is not limited as to such matters or otherwise than as the prior art and the appended claims may require

I claim:
1. The process of converting sulphite liquors into tanning extracts which consists in spraying the liquor in the form of a mist into the air to remove gaseous components and to oxidize other components, treating the sprayed liquor with alkaline earth metal oxide compound sufficient to decompose the reversible sulphurous acid present in combination with the substances dissolved from wood to increase the elimination of sulphur as mono-sulphite and filtering the basic liquor to remove the insoluble constituents, concentrating the filtered liquor, treating the concentrated liquor with a modicum of sulphuric acid to convert the equivalent organic salts into corresponding organic acids which are the tanning agents and to convert alkaline earth metal constituents equivalent thereto into insoluble form, and filtering the concentrated liquor to remove the insoluble constitutents.

2. The process of converting sulphite liquors into tanning extracts which consists in filtering and spraying the liquor while nearly boiling in the form of a mist into the air to remove gaseous compounds which act as acids and to oxidize other compounds, agitating the sprayed liquor at substantially 80 to 85 degrees centigrade with alkaline earth metal oxide compound until loosely combined sulphur dioxide is changed to the sulphite of the alkaline earth metal and until the hydrogen ion concentration of the liquor is pH=9, filtering the basic liquor to remove the insoluble constituents and concentrating it, treating the concentrated liquor at less than 40° centigrade with sulphuric acid between 32 and 35 degrees Baumé referred to 15 degrees centigrade until it reacts faintly acid, and filtering at 30 to 35 degrees centigrade the resulting liquor to remove the insoluble constituents and leave the tanning agent in solution of about 30 to 35 degrees Baumé.

3. The process of converting sulphite liquors into tanning extracts which consists in removing sulphur and gaseous components and oxidizing organic compounds and changing the reaction of the liquor from acidic to basic by spraying it in the form of a mist and by treating it with alkaline earth metal compounds, removing insoluble matter from the liquor, treating the resultant liquor with sulphuric acid insufficient for producing substantial mineral acidity and sufficient to cause Congo red test paper to become faintly blue to convert organic salts into corresponding acids which are the tanning agents and to simultaneously convert basic constituents into insoluble form, and removing the insoluble basic constituents.

4. The process of converting sulphite liquors into tanning extracts which consists in removing sulphur and gaseous components and oxidizing organic componds and changing the reaction of the liquor from acidic to basic by spraying it at substantially boiling temperature in the form of a mist and by treating it at substantially 80 to 85 degrees centigrade with alkaline earth metal compounds, treating the resultant liquor at less than 40 degrees centigrade with sulphuric acid from 32 to 35 degrees Baumé to convert organic salts into corresponding acids which are the tanning agents and to simultaneously convert basic constituents which were combined with them into insoluble form, and removing the insoluble basic constituents by filtration at from 35 to 40 degrees centigrade until the discharging extract will have a density of about 30 to 33 degrees Baumé.

5. The process of converting sulphite liquors into tanning extracts which consists in changing the reaction of the liquor from acidic to basic and removing sulphur and undesirable constituents by neutralizing it with alkaline earth metal compounds, treating the resultant liquor with a modicum of sulphuric acid and limiting the mineral acidity of the liquor to subtantially the degree indicatable by the turning point of Congo red test paper to convert organic salts into corresponding acids which are the tanning agents and to convert basic constituents into insoluble form, and removing insoluble basic constituents by filtration.

6. The process of converting sulphite liquors into tanning extracts which consists in spraying the liquor in the form of a mist into the air to remove gaseous components and to oxidize other components, subjecting the sprayed liquor to partial fermentation into ethyl alcohol, recovering the alcohol, treating the residual liquor with alkaline earth metal oxide compound sufficient to decompose the reversible sulphurous acid present in combination with the substances dissolved from wood to increase the elimination of sulphur as mono-sulphite and to convert sulphur into insoluble form, filtering the basic liquor to remove the insoluble constituents, concentrating the filtered liquor, treating the concentrated liquor with sulphuric acid to convert the organic salts into corresponding organic acids which are the tanning agents and to convert the basic constituents into insolube form, and filtering the concentrated liquor to remove the insoluble constituents.

7. The process of converting sulphite liquors into tanning extracts which consists in spraying the liquor in the form of a mist into the air to remove gaseous components and to oxidize other components, treating the sprayed liquor with a portion of the required quantity of alkaline earth metal oxide compounds to facilitate fermentation and filtering it, subjecting the sprayed liquor to partial fermentation into ethyl alcohol, recovering the alcohol, treating the residual liquor with the remainder of the required alkaline earth metal oxide compounds to convert sulphur into insoluble form, filtering the basic liquor to remove the insoluble constituents, concentrating the filtered liquor, treating the concentrated liquor with sulphuric acid to convert the organic salts into corresponding organic acids which are the tanning agents and to convert the basic constituents into insoluble form, and filtering the concentrated liquor to remove the insoluble constituents.

WEBSTER E. BYRON BAKER.